United States Patent [19]

Steffen

[11] Patent Number: 4,972,426
[45] Date of Patent: Nov. 20, 1990

[54] LASER PROVIDED WITH AN IMPROVED SECURING ARRANGEMENT FOR ITS ACTIVE MEDIUM

[75] Inventor: Jürg Steffen, Sigriswil, Switzerland

[73] Assignee: Asulab S.A., Bienne, Switzerland

[21] Appl. No.: 444,957

[22] Filed: Dec. 4, 1989

[30] Foreign Application Priority Data

Dec. 5, 1988 [FR] France ................... 88 16039

[51] Int. Cl.⁵ .............................................. H01S 3/045
[52] U.S. Cl. ........................................ 372/35; 372/66; 372/72
[58] Field of Search ................ 372/70, 72, 66, 35, 372/39, 40, 41

[56] References Cited

U.S. PATENT DOCUMENTS

| | | | |
|---|---|---|---|
| 3,992,684 | 11/1976 | Patrick et al. | 372/35 |
| 4,378,601 | 3/1983 | Eggleston, III et al. | 372/66 |
| 4,468,774 | 8/1984 | Robbins | 372/34 |
| 4,563,763 | 1/1986 | Kuhn | 372/72 |
| 4,653,061 | 3/1987 | Fukae | 372/66 |
| 4,730,324 | 3/1988 | Azad | 372/66 |
| 4,761,789 | 8/1988 | Fukae | 372/34 |
| 4,881,233 | 11/1989 | von Arb et al. | 372/35 |

Primary Examiner—Frank Gonzalez
Assistant Examiner—Susan S. Morse
Attorney, Agent, or Firm—Griffin Branigan & Butler

[57] ABSTRACT

The invention discloses an optically pumped laser comprising suspension means (7) for the bar (2) having inherent elasticity for assuring elastic gripping of the latter. The suspension means (7) comprise at least two suspension elements (17a, 17b) having a generally planar form extending parallel to the pumping faces of the bar. Each suspension element exhibits at least one peripheral securing zone (19a, 19b), a central clamping zone (20a, 20b) and an elastically deformable intermediate zone (21a, 21b) coupling these latter.

34 Claims, 4 Drawing Sheets

LASER PROVIDED WITH AN IMPROVED SECURING ARRANGEMENT FOR ITS ACTIVE MEDIUM

This invention concerns lasers, in particular optically pumped lasers employing bars of the SLAB type as an active medium and more particularly an arrangement for securing these bars in the lasers.

BACKGROUND OF THE INVENTION

There has already been disclosed in the patent document U.S. Pat. No. 4,378,601 an optically pumped laser having an arrangement for securing the SLAB type bar. This laser comprises essentially a housing intended to receive the bar and in which there circulates a cooling fluid. Additionally, the laser comprises a luminous source arranged on either side of the bar in order to bring about optical pumping in the active medium. The bar is mounted in a securing arrangement which may be introduced into the housing or withdrawn therefrom.

This securing arrangement comprises on the one hand first longitudinal support elements having a U-formed cross-section and which are provided with lugs at their ends, these elements enveloping the upper face and the lower face of the bar and on the other hand second support elements having a configuration complementary to that of the ends of the bar so as to be attachable thereto. The lugs of the first support elements cooperate with slots provided in the second support elements in order to maintain the bar in a rigid frame intended to be installed in a housing.

This securing arrangement has the advantage of rigidly maintaining the bar in the laser without bringing about mechanical stresses in the latter. One thus avoids the risk of having variations of the refractive index in the bar, such variations having as effect an alteration of the quality of the laser beam.

However, this arrangement also gives rise to a difficulty. Effectively, since the bar is totally immersed in the cooling fluid except for its extremities, the lateral faces of the bar are cooled just as the upper and lower faces. Consequently, the temperature gradient following a path which is perpendicular to the upper and lower faces of the bar, varies according to whether this path is close to or remote from a lateral face and this brings about edge effects diminishing the yield of the laser.

Another type of securing means of the bar in a laser described in patent document U.S. Pat. No. 4,761,789 attempts to overcome this difficulty by isolating the lateral faces of the bar from the cooling fluid. This laser comprises a bar placed between two transparent laminae, the bar and the laminae being arranged between two support plates, each of these including a rectangular opening which extends substantially over the length of the bar. Packing gaskets assure sealing around the periphery of the openings between the laminae and the support plates. On these openings there are arranged to be aligned for instance pumping reflectors having substantially a U-form cross-section which, together with the laminae bound a circulation space for a cooling fluid as well as a housing for an optical excitation source for the bar. Finally, between each support plate and the outer framework there is provided a bracing frame bounding a second cooling channel, the assembly being mechanically clamped in order to guarantee good securing of the bar and good sealing.

Nevertheless, the solution suggested by the above mentioned document does not bring about entire satisfaction. Effectively, during the mechanical clamping of the assembly, the clamping effort is not checked with the result that it is very difficult to obtain an appropriate clamping.

If the clamping is too great, one induces mechanical stresses in the bar and there result therefrom variations in the refractive index which change the quality of the beam.

On the other hand, should the clamping be insufficient, the transmission of the quantity of heat through the laminae, the support plates etc. diminishes thereby bringing about a lowering of the laser yield.

The invention thus has as its main purpose to remedy these difficulties arising in the abovementioned prior art by furnishing a laser provided with a securing arrangement for the bar which eliminates the influence of the clamping force while isolating the lateral faces of the bar from the cooling liquid.

SUMMARY OF THE INVENTION

To this effect, this invention has as its object to provide an optically pumped laser in which the laser medium is formed by a bar having at least two opposed faces between which the generated laser beam propagates along a zigzag path by total reflection from said faces, said bar being arranged in a framework together with which it bounds four volumes, two by two, for which the lateral faces of the bar at least indirectly form wall portions, the opposed volumes corresponding to the pumping faces of the bar receiving optical excitation means and being intended to transport a cooling fluid, the laser also comprising suspension means which assure on one hand the securing by clamping of the bar relative to the framework while bearing on said framework and on the other hand the separation two by two of said volumes.

In conformity with the invention, the suspension means have an inherent elasticity in order to assure elastic gripping of the bar and bear at least on zones proximate the periphery of the pumping faces.

Thanks to the elastic characteristics of the suspension means, the expansion of the bar may be readily absorbed when there are substantial temperature variations. There results thus an absence of mechanical stresses in the bar to the extent that the yield and the quality of the laser beam are increased.

Furthermore, thanks to this arrangement, the securing of the bar in the laser is facilitated while eliminating the influence of the clamping force on the characteristics of the laser beam.

The invention also has as its object an active laser element formed by a bar having at least two opposed faces between which the generated laser beam is propagated according to a zigzag path by total reflection on the two faces as well as suspension means of this bar.

This active element is noteworthy in that the suspension means comprise at least two suspension elements having a generally planar form extending substantially parallel to the pumping faces and a coupling frame, each suspension element exhibiting at least a peripheral securing zone, a central clamping zone and an elastically deformable intermediate zone coupling these latter and in that the clamping zone elastically grips the bar at least on the respective peripheral zones of the pumping faces with however the peripheral securing zone being rigidly secured to the coupling frame.

Such an element thus constitutes an independent subassembly which may be readily prepared in advance and stored and, if necessary, tested before being mounted into the laser.

Furthermore, this element may be installed and changed rapidly without difficulty.

Other characteristics and advantages of the invention will appear clearly from the following description of the non-limiting embodiments thereof taken together with the attached drawings.

DESCRIPTION OF THE PREFERRED EMBODIMENTS

Figure 1:
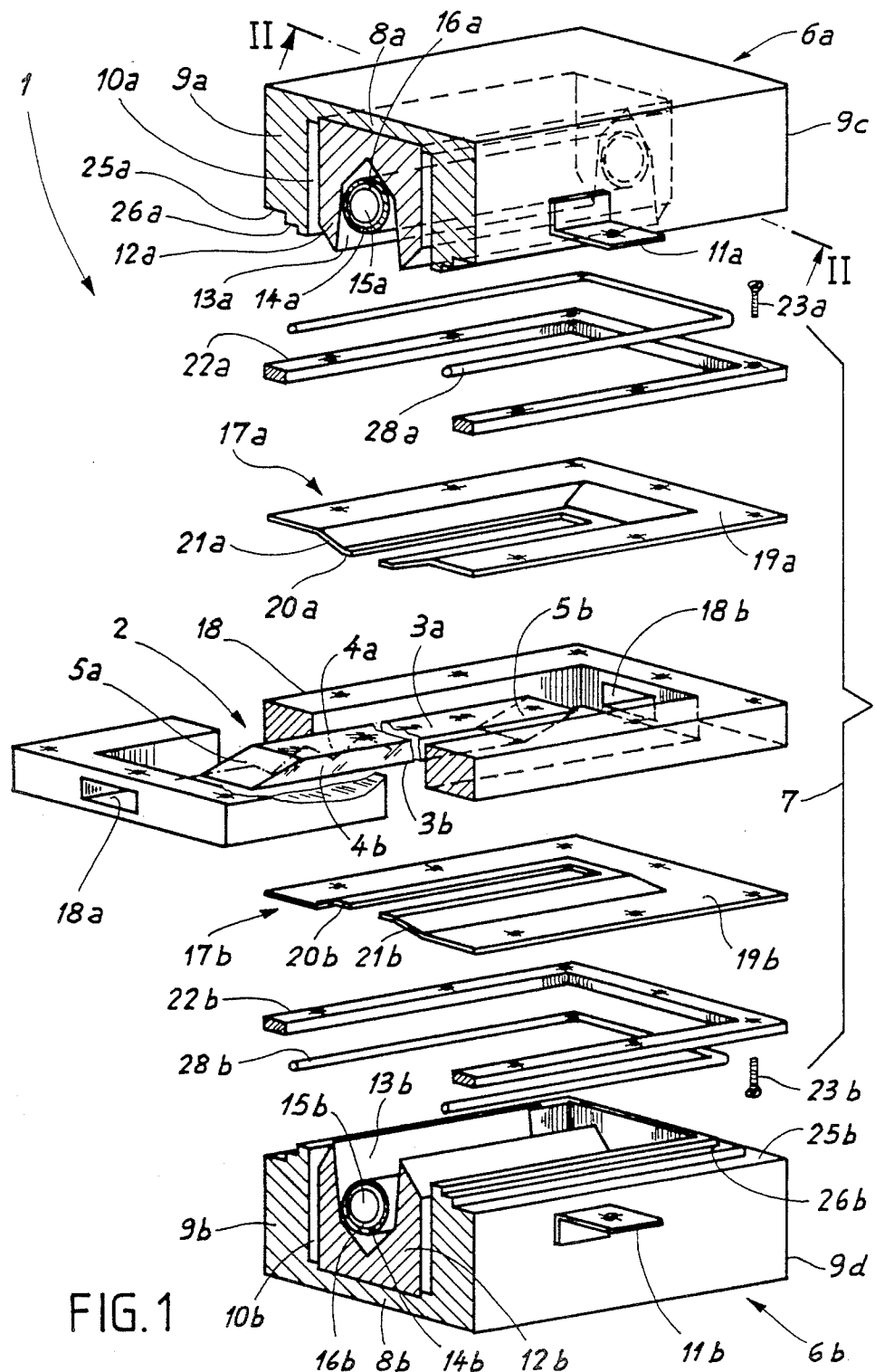
FIG. 1 is a perspective of an exploded view of a laser in accordance with the invention.

Referring initially to FIG. 1, one sees an optically pumped laser designated generally by reference 1, showing the essential characteristics of the invention.

A bar 2 (referred to as "SLAB") constitutes a medium in which the laser effect is generated. In the embodiment as shown, bar 2 exhibits a rectangular section with two opposed major faces 3a, 3b which are in this case, at the same time the pumping faces and the total reflection faces thus to confer a zigzag path to the generated cylindrical laser beam.

Bar 2 also exhibits two lateral faces 4a, 4b and two end faces 5a, 5b.

In the example as shown, the end faces are cut onto the bar substantially according to the Brewster angle $\alpha$ in order to reduce losses. As is well understood, the end faces may also be normal or inclined by $180° - 2\alpha$ relative to the optical axis of the laser.

The bar 2 is arranged in an assembly comprising essentially a framework in two parts 6a, 6b and bar suspension means generally designated by reference 7. The two parts extend symmetrically on either side of the faces 3a, 3b of the bar.

Each part of framework 6a, 6b exhibits a base 8a, 8b having the form of an elongated rectangle from which extend perpendicularly two lateral walls 9a, 9b and two end walls 9c, 9d defining a cavity 10a, 10b in which circulates a cooling fluid (not shown).

The two parts of the framework 6a, 6b are coupled together via a plurality of pairs of fastening lugs 11a, 11b—only one of which pairs is visible on the drawing—fastened onto lateral walls 9a, 9b and corresponding screws (not shown).

It will be noted that in the example as shown each part of framework 6a, 6b is obtained in one piece by machining.

As is well understood, these latter could also be obtained from several parts assembled together by screws or the like.

Each part of the framework 6a, 6b further comprises a pumping reflector 12a, 12b rigidly secured to its base 8a, 8b. These reflectors 12a, 12b are elongated pieces exhibiting a transversal cross-section substantially in the form of a U and which extend over faces 3a, 3b of the bar through its entire length. The base and the lateral walls of each reflector 12a, 12b are constructed in a manner to present reflection faces 13a, 13b coated for instance with a gold layer.

The parts of framework 6a, 6b likewise form a support and a housing for an optical excitation source for the bar. The excitation source is formed by a tube 14a, 14b receiving a discharge lamp 15a, 15b and bounding channels 16a, 16b around the latter for the circulation of a cooling fluid.

Figure 2:
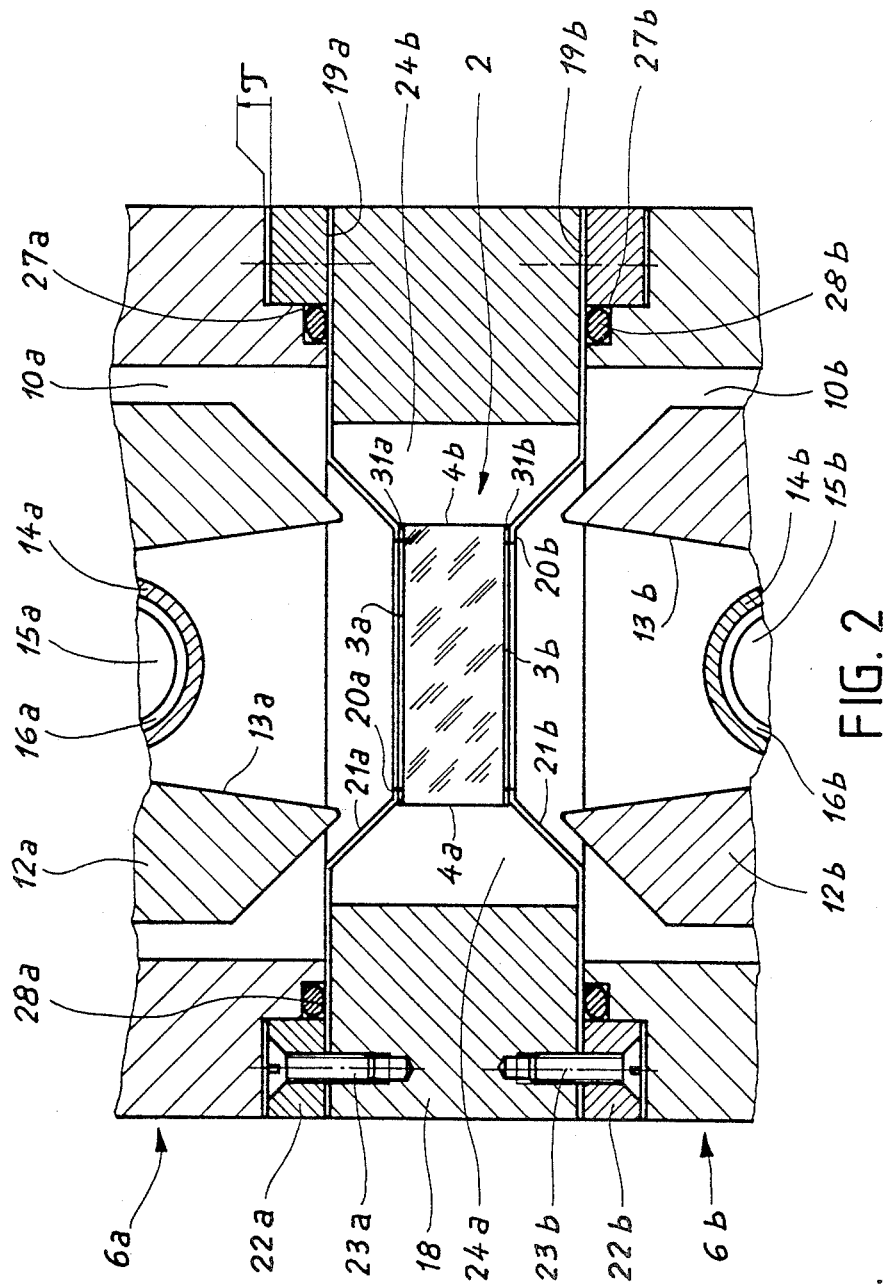
FIG. 2 is a partial cross-section along line II—II of FIG. 1 at an enlarged scale of a first embodiment of the suspension means of the bar equipping the laser in accordance with the invention.

The laser, in accordance with the invention, illustrated on FIGS. 1 and 2 exhibits a first embodiment of the suspension means 7. These latter constitute an independent active laser element and comprise essentially two suspension elements 17a, 17b each having the configuration of an elastically deformable leaf and a coupling frame 18. In the embodiment shown the leaves each have the form of a basin with an open bottom.

The suspension elements 17a, 17b are obtained preferably by cold stamping from a leaf of a metallic alloy of approximately 1/10 mm thickness. It will be noted in passing that such a method of manufacture presents the advantage of being rapid and economical while conferring great dimensional precision on the parts as obtained.

Each suspension element 17a, 17b has a peripheral securing zone 19a, 19b intended to cooperate with the coupling frame 18 and a part of the framework 6a, 6b, a clamping zone 20a, 20b intended to hold the bar 2 and an intermediate zone 21a, 21b coupling the peripheral securing zone 19a, 19b and the clamping zone 20a, 20b while bestowing on said elements a good elasticity.

As will clearly appear from the figures, in this embodiment the clamping zone 20a, 20b and the peripheral securing zone 19a, 19b are not in the same plane. Furthermore, the width of the clamping zone 20a, 20b is greatly inferior to the width of the peripheral securing zone 19a, 19b in order not to diminish the active surface of the bar. As a typical example the clamping zone has a width of about 0.5 mm while the peripheral securing zone has a width of about 10 mm.

In this embodiment the peripheral securing zone 19a, 19b of each suspension element 17a, 17b is gripped between the coupling frame 18—constituting in this particular case a bracing frame—and a flanging frame 22a, 22b. The assembly is maintained for instance by means of a plurality of screws 23a, 23b (symbolized by dots along the axes) regularly distributed around the periphery of the flanging frame 22a, 22b, whilst the clamping zone 20a, 20b holds bar 2 by faces 3a, 3b thereof.

One may also provide in a constructional variant of separation means from the bar that this latter be clamped by its lateral faces.

As is well understood, the coupling frame 18 comprises two openings 18a, 18b provided opposite faces 5a, 5b of the bar in order to allow passage for the laser beam generated in this latter.

When the set of elements constituting the suspension means 7 is assembled, bar 2 is elastically gripped between the clamping zones 20a, 20b of these latter with the result that one eliminates all excessive clamping likely to cause mechanical stresses in the bar.

Figure 3:
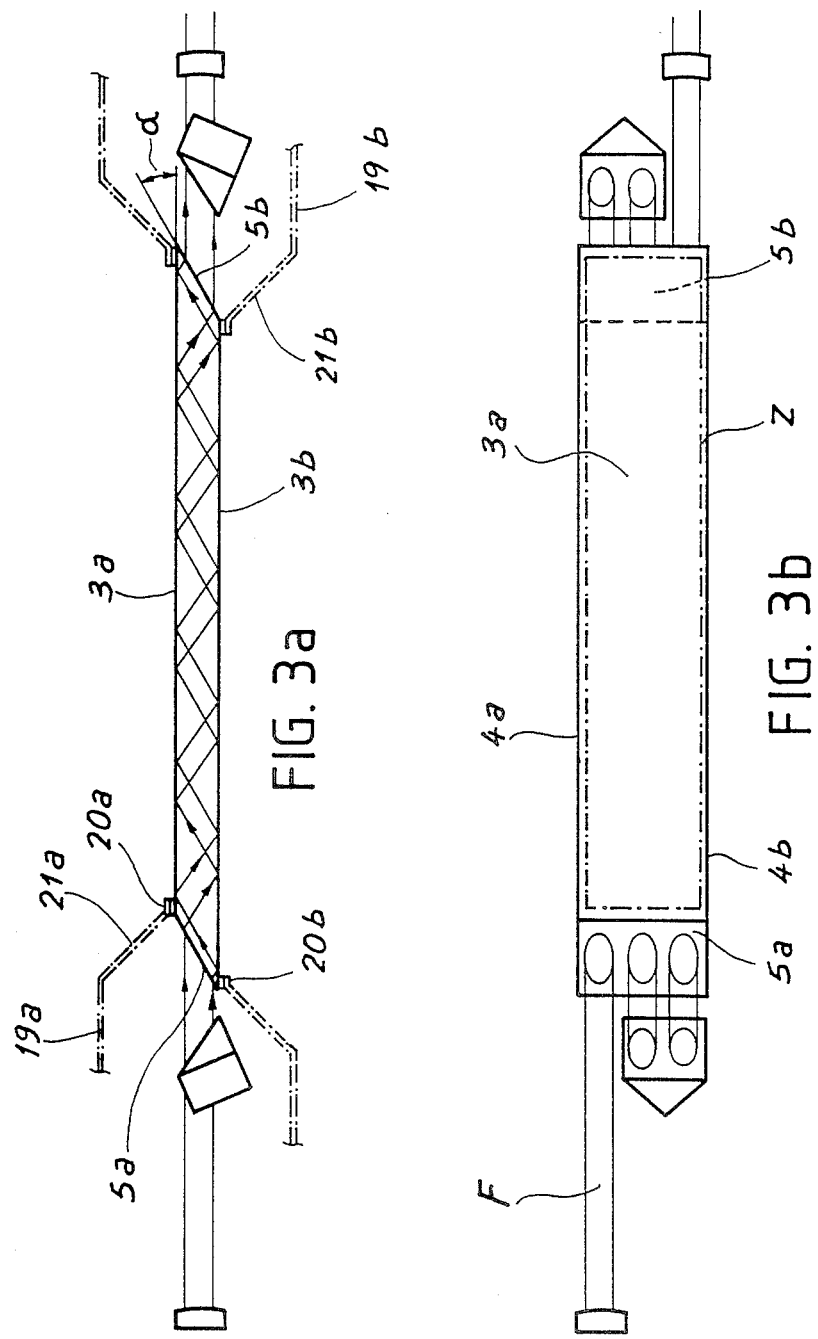
FIGS. 3a, 3b show respectively a side view and a top view of a bar, the framework and a portion of the suspension elements having been omitted.

The clamping zones 20a, 20b are fixed to faces 3a, 3b of the bar by soldering and preferably in a zone of the edge Z where the beam is not reflected (FIGS. 3a, 3b) in order not to diminish the yield of the beam.

The soldering of the clamping zones 20a, 20b may be brought about by well known techniques of hot or cold soldering such as metallic brazing, employment of a seal of glass frit or of an indium seal or the like.

Preferably the suspension elements and the solder bead are chosen from materials exhibiting thermal expansion characteristics substantially equal to those of the bar. For instance, for a YAG bar, one will preferably employ a support element in an alloy comprising 28% nickel, 23% cobalt and 49% iron such as "Vacovit 70" (registered trademark) and a solder bead of a material "Carpenter Glass Sealing 45-5" (registered trademark).

The employment of such materials presents in particular the advantage of conferring to the assembly good sealing and high stability over a long time period.

It will also be noted that thanks to the solder bead 31a, 31b one assures support of the bar as well as sealing between cavity 10a, 10b and channels 24a, 24b defined between the suspension elements 17a, 17b and the lateral faces 4a, 4b of the bar. These channels 24a, 24b are thus isolated from the cooling fluid, thereby suppressing edge effects due to the cooling of the lateral faces 4a, 4b.

The flanging frame 22a, 22b has two functions: the first consists in protecting the suspension elements 17a, 17b against direct and/or excessive clamping from screws 23a, 23b which would risk damaging such elements and the second that of centering the set of suspension elements and the bar within the framework.

Effectively, each part of framework 6a, 6b comprises at the end of its lateral walls and its end walls two breaking formations forming successive steps 25a, 25b, 26a, 26b.

The first step 25a, 25b cooperates with the flanging frame 22a, 22b at the time of assembly of the suspension means 7 with the parts of framework 6a, 6b. Thus, bar 2 is easily and systematically mounted into the correct position, i.e. such that the faces 3a, 3b directly face the pumping reflectors 12a, 12b.

The second step 26a, 26b cooperates during assembly with the flanging frame 22a, 22b and a portion of the clamping zone 20a, 20b of the suspension element 17a, 17b to bound a housing 27a, 27b adapted to receive a packing gasket 28a, 28b so as to assure sealing between the exterior and the cooling channel 10a, 10b.

It will be noted in this respect that in order to crush gasket 28a, 28b against the suspension element 17a, 17b and thus assure good sealing of the assembly, it is useful to provide clearance J between the plane of the step 25a, 25b and the upper face of the flanging frame 22a, 22b.

Figure 4:
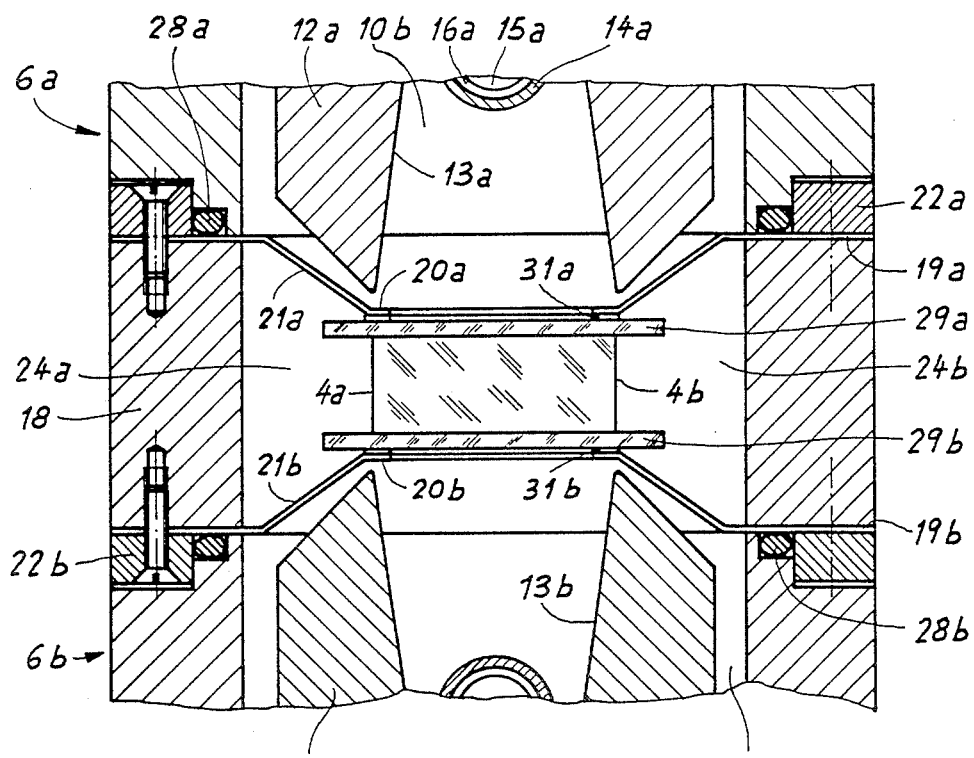
FIG. 4 is a partial cross-section of a variant of the embodiment of FIG. 2.

On FIG. 4 is shown a variant of the first embodiment of the laser according to the invention in which the suspension elements 17a, 17b do not directly support bar 2.

In this case, the bar is interposed between two transparent laminae 29a, 29b formed for instance from sapphire or the like and on which the clamping zone 20a, 20b is determined by well known soldering means. Preferably, each lamina 29a, 29b projects beyond the lateral side of the bar 2 by a distance equal or greater than the thickness of the latter.

Nevertheless, it will be noted that in order not to risk bending of the edges of laminae 29a, 29b and consequently causing stresses within the bar, the location of the clamping zones 20a, 20b of the suspension elements is arranged normal to the edges of the bar.

Additionally, since the suspension elements are not directly fastened to the surface of the bar, this variant permits easy replacement of the bar.

In an advantageous manner, these laminae may constitute a selection filter for the optical frequencies used to excite the bar with the result that only the useful spectrum bands of the excitation light reach the faces of the bar and the heating due to parasitic radiation is suppressed.

Figure 5:
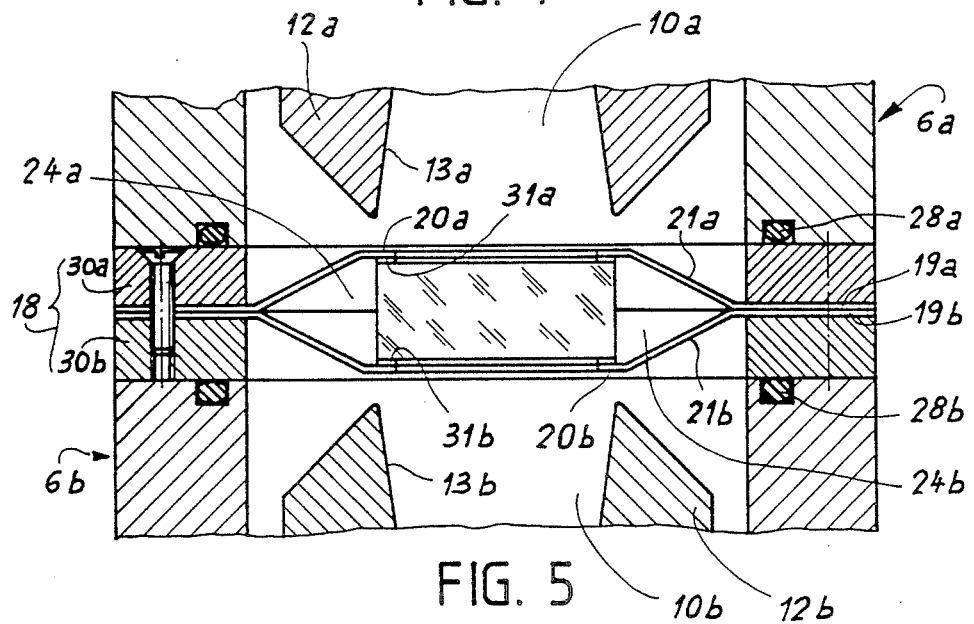
FIG. 5 is a partial transversal cross-section at an enlarged scale of a second embodiment of the suspension means of the bar equipping the laser in accordance with the invention.

Finally, referring to FIG. 5, one sees a second embodiment of a laser according to the invention in which identical elements have been designated by the same reference numbers as those previously employed.

Thus, while in the embodiment shown on FIGS. 1 to 4, the peripheral securing zones 19a, 19b of the suspension elements 17a, 17b are separated from one another by means of a bracing frame 18, in the second embodiment shown on FIG. 5, the peripheral securing zones 19a, 19b of the suspension elements 17a, 17b abut one another and are clamped together by two frame elements 30a, 30b.

It is well evident that openings such as those provided in the coupling frame 18 shown on FIG. 1 must be provided in the suspension elements and in the frame elements opposite faces 5a, 5b.

As is likewise well understood, the invention is not limited to the embodiments described and one may foresee further variants without departing from the frame of the invention. One may in particular foresee the employment of the arrangement according to the invention in a laser in which the active medium is a fluid medium, this latter being confined in a sealed enclosure in a transparent material having the form of a "SLAB" bar.

One may likewise provide suspension elements 17a, 17b formed from a single piece, these latter being coupled by a coupling strip or the like. In this case the basin form of each element may be for instance simultaneously stamped in a metal leaf after which this latter is bent in an appropriate manner.

In another embodiment of the invention, each of said suspension elements 17a, 17b may be obtained in pressed glass according to a predetermined configuration for instance according to the form of a basin.

Finally, the active element of the laser advantageously constitutes a sub-assembly bar/suspension means being adapted to be readily replaced.

What I claim is:

1. An optionally pumped laser in which the laser medium is formed by a bar having at least two opposed faces between which the generated laser beam propagates along a zigzag path by total reflection from said faces, said bar being arranged in a framework together with which it bounds four volumes, two by two, for which the lateral faces of the bar at least indirectly form wall portions, the opposed volumes corresponding to the pumping faces of the bar receiving optical excitation means and being intended to transport a cooling fluid, the laser also comprising suspension means which assure on the one hand the securing by clamping of the bar relative to the framework while bearing on said framework and on the other hand the separation two by two of said volumes, wherein said suspension means have inherent elasticity to assure elastic gripping of the bar and bear at least one zones proximate the periphery of the pumping faces, and wherein the suspension means comprise at least two suspension elements having a generally planar form extending parallel to the pumping faces of the bar, each suspension element having at least one peripheral securing zone, a central clamping zone and an elastically deformable intermediate zone coupling these latter.

2. A laser as set forth in claim 1 wherein the suspension means are supported on the edge zone of the pumping faces of the bar.

3. A laser as set forth in claim 1 wherein each of the suspension elements is realized in the form of a leaf having the configuration of a bottomless basin, the suspension means further comprising a connecting frame.

4. A laser as set forth in claim 1 or in claim 4 wherein the suspension means further comprise a bracing frame arranged between the peripheral securing zone of each leaf.

5. A laser as set forth in claim 1 or in claim 4 wherein the connecting frame comprises two frame elements between which are clamped the peripheral securing zones of the leaves.

6. A laser as set forth in claim 3 wherein the clamping zone of the leaves is coupled to the pumping faces of the bar by soldering.

7. A laser as set forth in claim 6 including a bar interposed between two plates of transparent material wherein the soldering of the clamping zones of each leaf is effected directly onto said plates.

8. A laser as set forth in claim 1 further comprising sealing means for confining the cooling fluid within the cooling channels.

9. A laser as set forth in claim 4 and further comprising sealing means for confining the cooling fluid within the cooling channels and wherein the sealing means comprise packing gaskets arranged between the peripheral securing zone of each leaf and the framework on the one hand, and a solder bead arranged between the bar and the clamping zone of each leaf on the other hand.

10. A laser as set forth in claim 3 wherein the leaves are formed from a material having substantially the same thermal expansion characteristics as those of the bar.

11. A laser as set forth in claim 3 wherein the bar is composed of yttrium garnet and aluminium and the leaves are formed from an alloy of 28% nickel, 23% cobalt and 49% iron.

12. An active laser element constituted by a bar having at least two opposed faces between which the generated laser beam propagates along a zigzag path by total reflection from said faces and suspension means for the bar wherein said suspension means comprise at least two suspension elements having a generally planar form extending substantially parallel to the pumping faces, and a coupling frame, each suspension element exhibiting at least one peripheral securing zone, a central clamping zone and an elastically deformable intermediate zone coupling these latter and wherein the clamping zone elastically grips the bar, at least on the respective peripheral zones of the pumping faces with however the peripheral securing zone being rigidly secured to the coupling frame.

13. An active laser element as set forth in claim 12 wherein each of the suspension elements is realized in the form of a leaf having the configuration of a bottomless basin.

14. An active laser element as set forth in claim 12 wherein the central clamping zone bears on the edge zone of the pumping faces of the bar.

15. An active laser element as set forth in claim 12 wherein the suspension means comprise a bracing frame arranged between the peripheral securing zone of each leaf.

16. An active laser element as set forth in claim 12 wherein the coupling frame comprises two frame elements between which the peripheral suspension zones of the leaves are clamped.

17. An active laser element as set forth in claim 12 wherein the clamping zone of the leaves is coupled to the pumping faces of the bar by soldering.

18. An active laser element as set forth in claim 17 including a bar interposed between two plates formed of a transparent material wherein the soldering of the clamping zones of each leaf is effected directly onto said plates.

19. An active laser element as set forth in claim 12 further comprising sealing means for confining a cooling fluid within cooling channels.

20. An active laser element as set forth in claim 19 wherein the sealing means comprise packing gaskets arranged between the peripheral securing zone of each leaf and the framework, on the one hand, and a solder bead arranged between the bar and the clamping zone of each leaf, on the other hand.

21. An active laser element as set forth in claim 12 wherein the leaves are formed from a material having substantially the same thermal expansion characteristics as those of the bar.

22. An active laser element as set forth in claim 12 wherein the bar is formed from yttrium garnet and aluminum and the leaves are formed from an alloy consisting of 28% nickel, 23% cobalt and 49% iron.

23. An optically pumped laser in which the laser medium is formed by a bar having at least two opposed faces between which the generated laser beam propagates along a zigzag path by total reflection from said faces, said bar being arranged in a framework together with which it bounds four volumes, two by two, for which the lateral faces of the bar at least indirectly form wall portions, the opposed volumes corresponding to the pumping faces of the bar receiving optical excitation means and being intended to transport a cooling fluid, the laser also comprising suspension means which assure on the one hand the securing by clamping of the bar relative to the framework while bearing on said framework and on the other hand the separation two by two of said volumes, wherein said suspension means have inherent elasticity to assure elastic gripping of the bar and bear at least on zones proximate the periphery of the pumping faces, the suspension means comprises leaf shape elements.

24. A laser as set forth in claim 23 wherein the suspension means are supported on the edge zone of the pumping faces of the bar.

25. A laser as set forth in claim 23 wherein the suspension means comprise at least two suspension elements having a generally planar form extending parallel to the pumping faces of the bar, each suspension element having at least one peripheral securing zone, a central clamping zone and an elastically deformable intermediate zone coupling these latter.

26. A laser as set forth in claim 23 wherein each of suspension elements have the configuration of a bottomless basin, the suspension means further comprising a connecting frame.

27. A laser as set forth in claim 25 wherein the suspension means further comprise a bracing frame arranged between the peripheral securing zone of each leaf.

28. A laser as set forth in claim 25 wherein the connecting frame comprises two frame elements between which are clamped the peripheral securing zones of the leaves.

29. A laser as set forth in claim 26 wherein the clamping zone of the leaves is coupled to the pumping faces of the bar by soldering.

30. A laser as set forth in claim 29 including a bar interposed between two plates of transparent material wherein the soldering of the clamping zones of each leaf is effected directly onto said plates.

31. A laser as set forth in claim 23 further comprising sealing means for confining the cooling fluid within the cooling channels.

32. A laser as set forth in claim 26 further comprising sealing means for confining the cooling fluid within the cooling channels and wherein the sealing means comprise packing gaskets arranged between the peripheral securing zone of each leaf and the framework on the one hand, and a solder bead arranged between the bar and the clamping zone of each leaf on the other hand.

33. A laser as set forth in claim 26 wherein the leaves are formed from a material having substantially the same thermal expansion characteristic as those of the bar.

34. A laser as set forth in claim 26 wherein the bar is composed as yttrium garnet and aluminum and the leaves are formed from an alloy of 28% nickel, 23% cobalt and 49% iron.

* * * * *